US011227230B2

(12) United States Patent
Childress et al.

(10) Patent No.: US 11,227,230 B2
(45) Date of Patent: Jan. 18, 2022

(54) AUTOMATED TECHNICAL CONTENT CONVERSION BASED ON USER UNDERSTANDING LEVEL

(71) Applicant: International Business Machines Corporation, Armonk, NY (US)

(72) Inventors: Rhonda L. Childress, Austin, TX (US); Darren L. Lawless, Aurora, CO (US); Crystal N. Moody, Atlanta, GA (US); Daniel S. Riley, Durham, NC (US); Michael J. Spisak, East Northport, NY (US)

(73) Assignee: International Business Machines Corporation, Armonk, NY (US)

( * ) Notice: Subject to any disclaimer, the term of this patent is extended or adjusted under 35 U.S.C. 154(b) by 1343 days.

(21) Appl. No.: 15/462,097

(22) Filed: Mar. 17, 2017

(65) Prior Publication Data

US 2018/0268309 A1     Sep. 20, 2018

(51) Int. Cl.
    *G06N 20/00*  (2019.01)
    *G06N 5/02*   (2006.01)
    (Continued)

(52) U.S. Cl.
    CPC ........... *G06N 20/00* (2019.01); *G06F 40/237* (2020.01); *G06F 40/30* (2020.01); *G06N 5/022* (2013.01); *G06N 5/04* (2013.01); *G06Q 10/10* (2013.01)

(58) Field of Classification Search
    CPC ........ G06N 20/00; G06N 20/10; G06N 20/20; G06N 5/00; G06N 5/02; G06N 5/022;
    (Continued)

(56) References Cited

U.S. PATENT DOCUMENTS 8,181,173  B2     5/2012  Childress et al.
2009/0287678 A1  11/2009  Brown et al.
(Continued)

OTHER PUBLICATIONS

"Tone Analyzer, Understand tone and style in written text", https://www.ibm.com/watson/developercloud/tone-analyzer.html, Accessed from the Internet on Apr. 19, 2017, 4 pages.
(Continued)

*Primary Examiner* — Shane D Woolwine
(74) *Attorney, Agent, or Firm* — Stephen J. Walder, Jr.; Jeffrey S. LaBaw

(57) ABSTRACT

Mechanisms are provided for modifying response of cognitive systems to user requests based on a determined knowledge level of the user and knowledge level of the concepts referenced in the cognitive system responses. The mechanisms receive a response to a user submitted request received from a client computing system and determine a first knowledge level of the user for a domain of the user submitted request. The mechanisms determine a second knowledge level associated with concepts referenced in the response and whether the first knowledge level is different from the second knowledge level. The mechanism, in response to the first knowledge level being different than the second knowledge level, modify content of the response to include concepts associated with the first knowledge level, to thereby generate a modified response. The modified response is then output to the client computing system associated with the user.

20 Claims, 4 Drawing Sheets

(51) Int. Cl.
*G06N 5/04* (2006.01)
*G06F 40/30* (2020.01)
*G06F 40/237* (2020.01)
*G06Q 10/10* (2012.01)

(58) Field of Classification Search
CPC ........ G06N 5/04; G06N 5/046; G06F 40/237; G06F 40/30; G06Q 10/10
See application file for complete search history.

(56) References Cited

U.S. PATENT DOCUMENTS

| | | |
|---|---|---|
| 2011/0066587 A1 | 3/2011 | Ferrucci et al. |
| 2011/0125734 A1 | 5/2011 | Duboue et al. |
| 2013/0007055 A1 | 1/2013 | Brown et al. |
| 2013/0018662 A1 | 1/2013 | Ferrucci et al. |
| 2013/0066886 A1 | 3/2013 | Bagchi et al. |
| 2014/0057242 A1* | 2/2014 | Sherman .................. G09B 7/00 434/353 |
| 2016/0048772 A1* | 2/2016 | Bruno .................... G06N 20/00 706/11 |
| 2016/0071517 A1* | 3/2016 | Beaver .................... G10L 15/22 704/9 |
| 2016/0188738 A1* | 6/2016 | Gruber .................. G06F 16/248 707/722 |
| 2018/0039632 A1* | 2/2018 | Tsunokawa ........... G06F 16/248 |

OTHER PUBLICATIONS

High, Rob, "The Era of Cognitive Systems: An Inside Look at IBM Watson and How it Works", IBM Corporation, Redbooks, Dec. 12, 2012, 16 pages.

McCord, M.C. et al., "Deep parsing in Watson", IBM J. Res. & Dev. vol. 56 No. 3/4 Paper 3, May/Jul. 2012, pp. 3:1-3:15.

Richardson, Lori, "IBM Watson Solution Offers Real-Time Facial Expression Data—Are We Ready", Score More Sales, https://www.scoremoresales.com/blog/watson-offers-real-time-facial-recognition, Jun. 30, 2015, 3 pages.

Yuan, Michael J., "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.

* cited by examiner

AUTOMATED TECHNICAL CONTENT CONVERSION BASED ON USER UNDERSTANDING LEVEL

BACKGROUND

The present application relates generally to an improved data processing apparatus and method and more specifically to mechanisms for performing automated technical content conversion based on user understanding level.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Sin® from Apple®, Cortana® from Microsoft®, and question answering pipeline of the IBM Watson™ cognitive system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and a memory, the memory comprising instructions which are executed by the processor to configure the processor to implement a knowledge system that operates to modify responses based on a knowledge level of a user. The method comprises receiving, by the knowledge system, from a cognitive computing system, a response to a user submitted request received by the cognitive computing system from a client computing system. The method further comprises determining, by the knowledge system, a first knowledge level of the user for a domain of the user submitted request and determining, by the knowledge system, a second knowledge level associated with first concepts referenced in the response. The method also comprises determining, by the knowledge system, whether the first knowledge level is different from the second knowledge level and modifying, by the knowledge system, in response to the first knowledge level being different than the second knowledge level, content of the response to include second concepts, corresponding to the first concepts, which are associated with the first knowledge level, to thereby generate a modified response. Moreover, the method comprises outputting, by the knowledge system, the modified response to the client computing system associated with the user.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
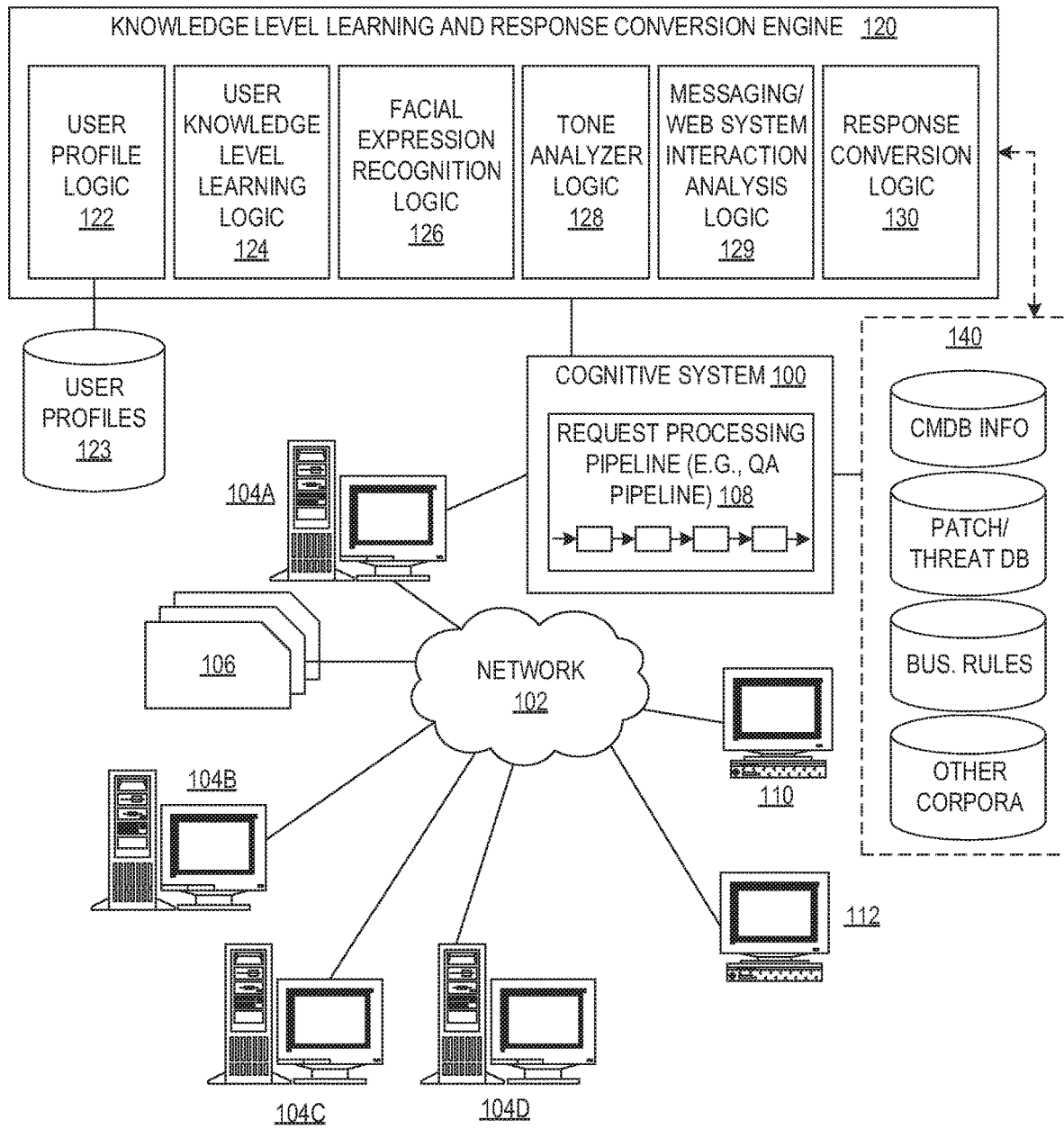
FIG. 1 depicts a schematic diagram of one illustrative embodiment of a cognitive system in a computer network.

The illustrative embodiments provide mechanisms for performing automated technical content conversion based on understanding level. That is, often technology individuals need to communicate with other individuals, e.g., customers, business persons, and the like, that may have a significantly lower level of technical understanding than the technology savvy individual. For example, it may be necessary for an information technology expert and/or computer system technician to communicate to an organization's business person the reason for a technical difficulty or technical feature of a product or the like, in terms that the business person will understand. That is, different individuals have different levels of technical expertise and understanding such that communicating information to one individual at a particular technical level may not be optimum for other individuals that do not have the same level of technical expertise to understand the communicated information. In other words, it would be beneficial to be able to convert technical information into a form that is understandable by the particular person to which the information is being conveyed, e.g., putting technical information into "layman's terms."

This problem also exists for automated systems, such as cognitive systems, which operate to communicate information requested by a user. Many times, because cognitive systems are quite literal in retrieving the information sought and presenting the information without concern as to the likelihood that the user will be able to understand the presented information, such systems present information that is not useful to the particular user. For example, informing a chief information security officer (CISO) that they have DDOS (Distributed Denial of Service) traffic that is affecting server x and network y is less effective and useful to the CISO than simply telling them that their payment processing system is at risk. However, there is currently no mechanism for gauging the ability of a user to understand various levels of technical information that may be presented by an automated cognitive system.

The illustrative embodiments provide mechanisms for automatically converting information being output by a cognitive system, such as in response to a user request for such information or natural language question posed to the cognitive system by the user, into corresponding content that is tailored to the technical expertise level of the user. In so doing, the mechanisms of the illustrative embodiment use resource knowledge, such as configuration management information for computing systems, software projects, organization computing infrastructures, and the like, to identify the organization of concepts, or ontology, and their correlation with the concepts present in the information being returned by the cognitive system, to map the information to a particular level of understanding corresponding to the user that is requesting the information. The level of understanding of the user may be identified from a user profile in which one or more attributes are recorded to specify the level of understanding of the user with regard to one or more domains of information. This level of understanding attribute may be determined from user input, e.g., the user specifying their own level of understanding, and/or machine learning of the user's level of understanding. The machine learning may be performed using mechanisms for evaluating feedback obtained from the user. The level of understanding may be determined, for example, by classifying the user into one or more predefined classifications based on the user's input and/or machine learning based on user feedback evaluations.

It should be appreciated that the mechanisms of the illustrative embodiments may be applied to any domain in which various levels of domain knowledge may be needed to understand a response from a cognitive system. For example, in the medical domain, a cognitive system may return a complex answer to question posed by a hospital administrator that assumes a physician's level of medical knowledge on the part of the hospital administrator, which business persons such as hospital administrators may not have. In a domain of many different business organizations, business level persons operating in the organization may request information from a cognitive system which may respond with information technology system based answers that assume a level of knowledge of an information technology or computer system architecture expert. Any implementation where the level of knowledge assumed by the cognitive system when responding to a request for information may differ from the level of understanding of the user requesting the information, may benefit from implementation of the mechanisms of the illustrative embodiments. For purposes of the following discussion, in order to provide an example implementation for illustrative purposes only, it will be assumed that the domain is a computer system software/hardware infrastructure of an organization, with the potential users requesting information about this domain being business level users. This is intended to be only an example and is not intended to state or imply any limitations with regard to the various modifications, alternatives, or implementations of the illustrative embodiments.

Thus, in the case of a large organization with many business applications, computing resources, and the like, one or more ontologies may be provided that comprise configuration information that specifies the configuration of the software resources (e.g., applications, databases, data stores, etc.) and hardware resources (e.g., servers, storage systems, etc.). For example, a Configuration Management Database (CMDB) system may be utilized which provides a repository or data warehouse for information technology (IT) installations and which holds data relating to a collection of IT assets (also referred to as configuration items (CIs)) including descriptive relationships between such assets. Such CIs and content of the CMDB may, in some cases, be obtained from discovery mechanisms, such as the IBM Tivoli Application Dependency Discovery Manager (TADDM), available from International Business Machines (IBM) Corporation of Armonk, N.Y. TADDM is a discovery and dependency mapping tool that provides visibility into the composition of business applications and their supporting infrastructure including, but not limited to, cross-tier dependencies, runtime configuration values, change histories, and the like.

Based on analysis of this ontological information (e.g., one or more ontologies of CIs of the CMDB which may be generated from TADDM discovery) by the mechanisms of the illustrative embodiments, the information concepts present in a cognitive system's response to a user may be mapped to related concepts at various levels of technical expertise. For example, if there is a problem with server x in network y, it may be determined by the mechanisms of the illustrative embodiments what business applications are affected and what functionality is impacted by the problem. For example, server x in network y may be mapped via the ontology to payment processing and thus, the problem in server x in network y may affect payment processing of the organization. Based on this mapping, the higher level understanding of business applications and/or functionality, e.g., payment processing is at risk, may be returned to the user as a response rather than the technical level details of "server x in network y is experiencing a bandwidth problem due to DDOS traffic," for example.

The level to which to map or covert the concepts in the cognitive system response may be specified by the user and/or cognitively learned by the cognitive system via machine learning mechanisms through observation and analysis of the user and their actions in response to previous results returned by the cognitive system. For example, in some illustrative embodiments, the user may be presented with a slider bar mechanism, or other graphical user interface (GUI) element, via which the user may specify their level of knowledge or comfort with a particular domain of information. The range of possible user levels may be predetermined and may have various scales depending on the particular implementation. For example, the scale may comprise at one end of the range an information technology expert level of understanding and at the other end of the range, a business person level of understanding. Various intermediate levels may be provided as well and the GUI element may allow discrete predetermined points to be selected along the range or may allow for a more fluid level of identification at any values within the range. Based on the users' selection of a level of knowledge or comfort, the user may be categorized into a user type that is indicative of the level of knowledge/comfort of that user. This information may be stored in a user profile associated with the user such that it may be retrieved by the cognitive system and utilized when converting cognitive system output to a level of understanding commensurate with the level of knowledge/ comfort of the user.

In some illustrative embodiments, in replacement of, or in addition to, the user specifying their own level of knowledge or comfort with a domain of information, the cognitive system may cognitively learn, via a machine learning process, the level of knowledge/comfort of the user from the user's reactions to outputs/responses generated by the cognitive system to previous requests for information. The user's reactions to outputs/responses generated by the cognitive system may be measured in a variety of different ways involving various technologies and analysis. The user's reactions may be determined from user input to the cognitive system, monitoring of the user via various image analysis, audio analysis, and the like. In some cases, a user's input to other systems, such as instant messaging systems, electronic mail systems, online help systems, online user collaboration websites, blogs, search engines, and the like, may be monitored and analyzed to determine patterns of inputs related to an output/response generated by the cognitive system that are indicative of a user's level of knowledge/comfort or understanding of the concepts conveyed in the output/ response.

For example, mechanisms may be implemented for monitoring user facial expressions in response to outputs generated by the cognitive system to previous requests submitted by the user. These facial expressions may be evaluated to determine the type of the facial expression and whether it is indicative of a lack of understanding of the output generated by the cognitive system, e.g., confusion, frustration, etc. This information may be correlated with a level of technical knowledge, e.g., level within the ontological information or CIs, corresponding to the concepts present in the output. Thus, if the user is determined to use facial expressions that indicate confusion or frustration when presented with outputs by the cognitive system that have concepts requiring a technical level of knowledge of the domain, then the cognitive system learns that this user requires higher level knowledge based outputs or responses and hence, requires that the outputs/responses generated by the cognitive system be converted or mapped to another level of understanding, e.g., mapping an IT technician level output/response to a business person level output/response.

It should be appreciated that the facial expression recognition may also identify facial expressions that are indicative of the user having understood or been pleased with the output/response generated by the cognitive system, indicating a level of knowledge/comfort on the part of the user. In such cases, and in cases of identifying confusion and frustration, features of the output/response generated by the cognitive system may be correlated to these indicators of understanding, confusion, or frustration so that the cognitive system learns what features to use and what features not to use in outputs/responses for this user. For example, these features may include technical terms and phrases to use or not to use when communicating outputs/responses to the user by the cognitive system. For example, it may be determined that the user is able to understand the output/ response when business department names are utilized, but not when particular computing system component names are utilized. For another user, it may be determined that this user is comfortable and understands outputs/responses that reference computer system components, e.g., server names, but not lower level network address and network based metric information is used. Thus, a mapping of user level of knowledge/comfort or understanding to particular terms, phrases, or other features of outputs/responses from the cognitive system may be learned based on facial expression analysis.

In some illustrative embodiments, this machine learning process may include, either alone or in combination with the user specified level of knowledge/comfort and/or the facial expression recognition, analyzing follow-up or clarifying questions or requests submitted by the user to the cognitive system. That is, the cognitive system may recognize that a user, within the same session, when presented with an output/response to a request, submits a subsequent request that is indicative of the user not understanding the output/ response or otherwise asking for clarification of the output/ response (hereafter simply referred to as the cognitive system's "response"). When identifying such a pattern, a correlation of concepts in the cognitive system's response to the follow-up or clarifying question/request is performed and based on the correlation, a level of knowledge/comfort is determined for the user. For example, if the user is presented with an response from the cognitive system that includes server names, and the user askes what business systems the servers are associated with, then it may be determined that the user is not comfortable or does not have the level of knowledge to understand server names and instead is more comfortable with and has the level of knowledge to understand business system level information. This may be recorded in the user's profile such that subsequent responses are converted to a business system level response rather than a more technical IT expert level response having server names.

In addition, the mechanisms of the illustrative embodiments may utilize tone analysis to analyze the tone of a user's subsequent input to the cognitive system responsive to the cognitive system's response. The tone analyzer may correlate key terms/phrases with sentiment or tone indicative of a level of confusion, frustration, or comfort in order to determine whether the user has a sufficient level of comfort and/or knowledge to understand the response the cognitive system generated. Again, based on this information, the cognitive system may learn the level of knowledge/comfort associated with the user and record this information in a user profile for later use in converting cognitive system responses to a level of knowledge/comfort associated with the particular user.

It should be appreciated that in some embodiments, such as in embodiments where speech recognition is utilized, audio analysis may also be performed to identify characteristics of a user's audible response to the cognitive system's output/response that is indicative of a level of knowledge/ comfort the user has with the concepts presented in the cognitive system's output/response. Tone analysis, volume level analysis, and the like, may all be utilized to characterize the user's reaction to the cognitive system's response to the user's request and thereby learn the use's level of knowledge/comfort with the concepts in the cognitive system's response and the domain of information as a whole.

Various combinations of the above, or other similar, analysis may be utilized to characterize a user's reaction to a response generated by a cognitive system. For example, a user may, via the slider mechanism or other GUI element, provide a baseline representation of their own perceived level of knowledge/comfort with a domain of information (e.g., users sometimes like to think they understand more about a domain than they actually do), which may then be augmented through machine learning to adjust the user's level of knowledge/comfort based on the cognitive system's determination of the user's level of knowledge/comfort through analysis of the user's reactions to responses generated by the cognitive system.

This information characterizing the user's reaction may then be correlated with an ontological level of the concepts in the output/response to indicate an ontological level at which outputs/responses for this user should be presented, e.g., this user is more comfortable with responses presented at a business level of knowledge rather than an IT technician level of knowledge. Thus, rather than the cognitive system presenting the same level of responses to each user regardless of the user's level of knowledge/comfort with a domain of information, the cognitive system may automatically convert the responses it generates to the level of knowledge/comfort of the particular user as specified by the user and/or learned through machine learning based on past reactions by the user to other responses generated by the cognitive system.

In some illustrative embodiments, the CIs or other representations of configuration information in the ontologies for a complex computing system, may include information regarding the business value of the corresponding components of the computing system, e.g., application, hardware system, or the like. For example, a scale of very low, low, moderate, high, very high, or the like, such as using the NIST 800-30 ratings and definitions of business impact, may be used with corresponding values being stored in the CIs or other representations of configuration information for the various components of the computing system. Thus, for example, a business application for payment processing in a credit card company may have a business value of very high and a corresponding value may be associated with a payment processing component CI as a whole, but an individual component, e.g., banner ad click-through processing, within an advertising component of the computing system, may be given a business value of low since it does not impact the primary functionality of the organization as significantly as payment processing. This information is provided to convey additional information to the end user when providing a cognitive system response to a user. For example, the user may not know the criticality of the particular system, or systems, at risk and such additional business value information may convey this information to the user in the cognitive system response.

In addition to relative business value of the components (software and/or hardware components) of the computing system, the CIs or other configuration information representations, may also include information regarding the seasonality or phases of the components. This seasonality/phase information may be paired with the business value information such that one or more pairings of seasonality and business value may be provided for each component indicating different times when the business value of the component may be different from other times. That is, the seasonality/phase information indicates when the corresponding component is considered to be of particular business value to the operation of the computing system and this information, for the same component, may be different for different implementations of the component. For example, in Australia, it may be determined that a check intake system's functionality is considered very important on Thursday mornings due to pensioners in Australia getting their pension checks on Wednesday and then going to the bank on Thursday morning to deposit them. However, check intake may have less business value on Sundays as the banks are closed. Thus, seasonality/phase information may be indicative of different business value at different times. The seasonality/phase information may be taken into account when generating a cognitive system response that references the business value of a component mentioned in the response as the business value may be dependent on the particular season/phase being asked about, or as a default measure, a current season/phase. Thus, over time, a response may be different depending on the particular seasonality/phase and corresponding business value.

It should be appreciated that business value and seasonality are only examples of data enhancements that may be utilized to provide additional explanatory content to the user in responses generated by the cognitive system. Other types of data enhancements that provide clarification or explanatory information to a user in a response generated by the cognitive system may be used without departing from the spirit and scope of the present invention.

The user's understanding of the business value and seasonality, or other data enhancements associated with the various components, may be learned over time by the mechanisms of the illustrative embodiments, such as by way of a machine learning process. For example, the illustrative embodiments may learn which component, such as payments processing, the end user is familiar with. If the user is unfamiliar with a component, i.e. previous responses to this user have not referenced this component or related components equal to or more than a predetermined number of times, then the response generated by the cognitive system may include references to the business value. As this machine learning progresses, business value and seasonality information may be reduced or discontinued with regard to this component in subsequent cognitive system responses.

Other considerations for learning whether a user is aware of the business value/seasonality of a component may include evaluation of follow-up or clarifying questions submitted by the user to determine if the user is familiar with the business value/seasonality of a component referenced in a cognitive system response, e.g., if a response includes a reference to the payments processing system and the user does not submit a follow-up or clarifying question within a predetermined time period asking about the business value/seasonality of the component, then this implies the user understands the business value/seasonality and does not require the additional information.

Moreover, through machine learning, the mechanisms of the illustrative embodiments may learn over time how often a user needs to be presented with the same information before they remember or are comfortable with that information, i.e. before the knowledge "sticks." Based on this indication, the mechanisms of the illustrative embodiments may present information to the user in cognitive system responses that has been presented to this same user previously, until a time at which the information has been presented a number of times equal to or exceeding the learned number of times the user requires to feel comfortable with that information. In order to achieve this, the mechanisms of the illustrative embodiments may store counter values associated with different components indicating how many times the business value/seasonality information, or the like, has been presented to the particular user. Similarly, analysis of facial expressions, as described herein, may also be used to determine the user's comfort level or level of knowledge of the business value/seasonality of components referenced in a cognitive system response.

As noted above, the business value and seasonality information may be used when generating cognitive system responses based on relative priorities of the components taking into account business value and seasonality applicable to the response. For example, if a response indicates that multiple components are involved or affected, the components may be prioritized based on business value and seasonality and a corresponding response is provided to the user indicating the highest priority component(s). For example, if a user asks the cognitive system what the risks are to their system, the cognitive system may determine a current threat to the cognitive system and the corresponding components of the computing system that are affected by that threat. Moreover, the cognitive system may identify a solution to the threat as well as corresponding information, such as from business rules or the like, as to the way in which the solution may be applied. This information along with the business value and seasonality information of the components may be used to determine a response, which is then converted to an appropriate level of knowledge/comfort based response for the particular user.

For example, assume that a user submits a question to the cognitive system of the type "What are my new threats?" The cognitive system analyzes the question based on a corpus/corpora of information regarding the computing system, which may include the various ontologies, CMDB and CIs generated based on discovery mechanisms such as TADDM, and the like mentioned above, as well as other information about the computing system including, but not limited to, patch information, threat information, and the like. From the threat information, an indication of the current threats, e.g., software exploits, to the computing system may be identified and corresponding patches that address the threat may be determined. The components, e.g., applications, of the computing system that are affected by the threat may also be determined and the corresponding hardware components, e.g., computing devices, that have that software installed may be identified. From the identification of the affected computing devices, the ontological information may be searched to identify the affected business systems, their business value, and their seasonality. Corresponding business rules may be obtained from a business rules database of the corpus/corpora that specifies business rules for applying patches to systems, potentially based on business value and seasonality.

From this various information, the computing system components that need to have the patch applied to address the current threat are identified and prioritized. For example, a prioritization mechanism, such as described in commonly assigned U.S. Pat. No. 8,181,173, entitled "Determining Priority for Installing a Patch into Multiple Patch Recipients of a Network," may be used to prioritize which computing system components should receive the patch before others based on the business value and seasonality.

In accordance with the illustrative embodiments, the resulting response may be personalized to the level of knowledge/comfort of the user requesting the information. For example, if the user is a CISO that has been determined to be comfortable with a level of response that includes names of servers, then the names of the servers that have the software that needs to be patched may be returned in the response. However, many times CISOs are business level individuals and it may well be the case that the illustrative embodiments have determined that the CISO does not have a sufficient comfort level with server names and instead usually requires business group level information, which would require a conversion of the cognitive system's response to a business group level representation of the same information. Thus, rather than responding to the user's request with technical level information, the cognitive system will convert the response to a business level response, e.g., "Latest threat is XYZ exploit which affects payment processing which is business critical. Based on current business rules, patching of payment processing systems should being no later than date X. Do you want me to open up a change request?"

Thus, the illustrative embodiments provide mechanisms for determining and cognitively learning a level of knowledge/comfort that a user has with various levels of domain specific information, e.g., on a scale from technical detailed information to business level information in the running example. The learning of the level of knowledge/comfort may comprise automated machine learning based on analysis of a user's reactions to previous responses generated by the cognitive system and correlations of features of these responses to different levels of knowledge. The illustrative embodiments further provide mechanisms for converting a response generated by a cognitive system to the level of knowledge/comfort of that user.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
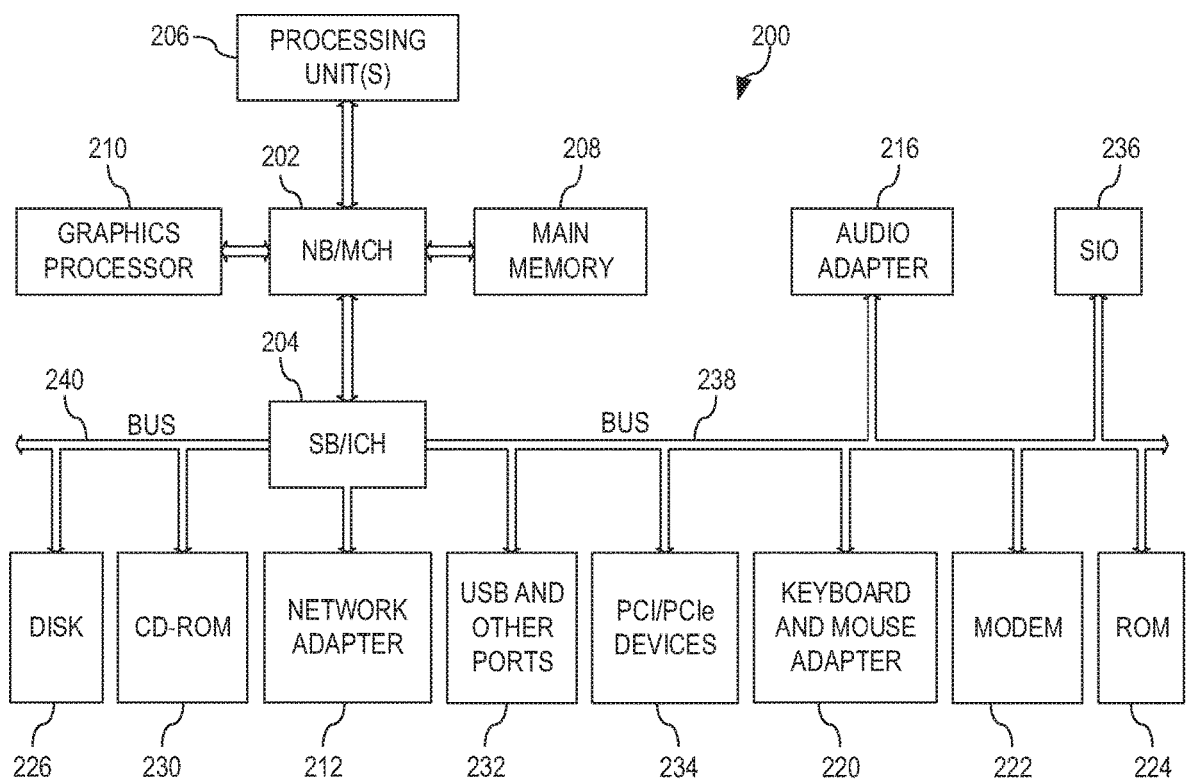
FIG. 2 is a block diagram of an example data processing system in which aspects of the illustrative embodiments are implemented.
Figure 3:
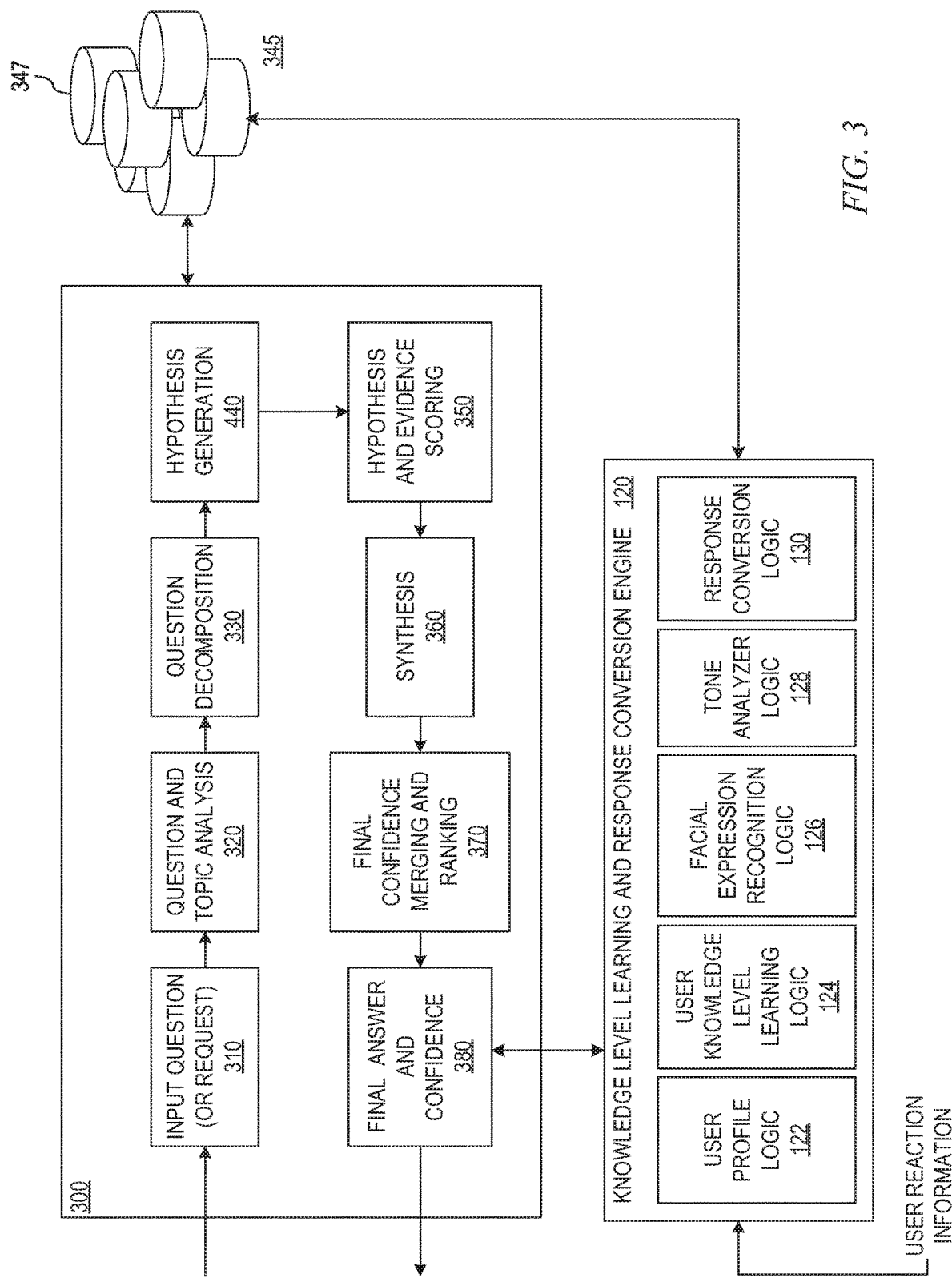
FIG. 3 illustrates a cognitive system processing pipeline for processing a natural language input to generate a response or result in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system which implements a request processing pipeline, such as a Question Answering (QA) pipeline (also referred to as a Question/Answer pipeline or Question and Answer pipeline) for example, request processing methodology, and request processing computer program product with which the mechanisms of the illustrative embodiments are implemented. These requests may be provided as structure or unstructured request messages, natural language questions, or any other suitable format for requesting an operation to be performed by the cognitive system.

It should be appreciated that the cognitive system, while shown as having a single request processing pipeline in the examples hereafter, may in fact have multiple request processing pipelines. Each request processing pipeline may be separately trained and/or configured to process requests associated with different domains or be configured to perform the same or different analysis on input requests (or questions in implementations using a QA pipeline), depending on the desired implementation.

Moreover, each request processing pipeline may have their own associated corpus or corpora that they ingest and operate on. In some cases, the request processing pipelines may each operate on the same domain of input questions but may have different configurations, e.g., different annotators or differently trained annotators, such that different analysis and potential answers are generated. The cognitive system may provide additional logic for routing input questions to the appropriate request processing pipeline, such as based on a determined domain of the input request, combining and evaluating final results generated by the processing performed by multiple request processing pipelines, and other control and interaction logic that facilitates the utilization of multiple request processing pipelines.

As noted above, one type of request processing pipeline with which the mechanisms of the illustrative embodiments may be utilized is a Question Answering (QA) pipeline. The description of example embodiments of the present invention hereafter will utilize a QA pipeline as an example of a request processing pipeline that may be augmented to include mechanisms in accordance with one or more illustrative embodiments. It should be appreciated that while the present invention will be described in the context of the cognitive system implementing one or more QA pipelines that operate on an input question, the illustrative embodiments are not limited to such. Rather, the mechanisms of the illustrative embodiments may operate on requests that are not posed as "questions" but are formatted as requests for the cognitive system to perform cognitive operations on a specified set of input data using the associated corpus or corpora and the specific configuration information used to configure the cognitive system. For example, rather than asking a natural language question of "What are the current threats to our computing system?", the cognitive system may instead receive a request of "identify our current computing system threats" or the like. It should be appreciated that the mechanisms of the QA system pipeline may operate on requests in a similar manner to that of input natural language questions with minor modifications. In fact, in some cases, a request may be converted to a natural language question for processing by the QA system pipelines if desired for the particular implementation.

As will be discussed in greater detail hereafter, the illustrative embodiments may be integrated in, augment, and extend the functionality of the QA pipeline(s), or request processing pipeline(s), by providing mechanisms for tailoring responses generated by the QA system, or cognitive system, to the particular learned level of knowledge/comfort of the user. Thus, it is important to first have an understanding of how cognitive systems and question and answer creation in a cognitive system implementing a QA pipeline is implemented before describing how the mechanisms of the illustrative embodiments are integrated in and augment such cognitive systems and request processing pipeline, or QA pipeline, mechanisms. It should be appreciated that the mechanisms described in FIGS. 1-3 are only examples and are not intended to state or imply any limitation with regard to the type of cognitive system mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

- Navigate the complexities of human language and understanding
- Ingest and process vast amounts of structured and unstructured data
- Generate and evaluate hypothesis
- Weigh and evaluate responses that are based only on relevant evidence
- Provide situation-specific advice, insights, and guidance
- Improve knowledge and learn with each iteration and interaction through machine learning processes
- Enable decision making at the point of impact (contextual guidance)
- Scale in proportion to the task
- Extend and magnify human expertise and cognition
- Identify resonating, human-like attributes and traits from natural language
- Deduce various language specific or agnostic attributes from natural language
- High degree of relevant recollection from data points (images, text, voice) (memorization and recall)
- Predict and sense with situational awareness that mimic human cognition based on experiences
- Answer questions based on natural language and specific evidence In one aspect, cognitive systems provide mechanisms for answering questions posed to these cognitive systems using a Question Answering pipeline or system (QA system) and/or process requests which may or may not be posed as natural language questions. The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a request processing pipeline 108, which in some embodiments may be a question answering (QA) pipeline, in a computer network 102. For purposes of the present description, it will be assumed that the request processing pipeline 108 is implemented as a QA pipeline that operates on structured and/or unstructured requests in the form of input questions. One example of a question processing operation which may be used in conjunction with the principles described herein is described in U.S. Patent Application Publication No. 2011/0125734, which is herein incorporated by reference in its entirety. The cognitive system 100 is implemented on one or more computing devices 104A-D (comprising one or more processors and one or more memories, and potentially any other computing device elements generally known in the art including buses, storage devices, communication interfaces, and the like) connected to the computer network 102. For purposes of illustration only, FIG. 1 depicts the cognitive system 100 being implemented on computing device 104A only, but as noted above the cognitive system 100 may be distributed across multiple computing devices, such as a plurality of computing devices 104A-D. The network 102 includes multiple computing devices 104A-D, which may operate as server computing devices, and 110-112 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 100 and network 102 enables question processing and answer generation (QA) functionality for one or more cognitive system users via their respective computing devices 110-112. In other embodiments, the cognitive system 100 and network 102 may provide other types of cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 100 may be used with components, systems, sub-systems, and/or devices other than those that are depicted herein.

The cognitive system 100 is configured to implement a request processing pipeline 108 that receive inputs from various sources. The requests may be posed in the form of a natural language question, natural language request for information, natural language request for the performance of a cognitive operation, or the like. For example, the cognitive system 100 receives input from the network 102, a corpus or corpora of electronic documents 106, cognitive system users, and/or other data and other possible sources of input. In one embodiment, some or all of the inputs to the cognitive system 100 are routed through the network 102. The various computing devices 104A-D on the network 102 include access points for content creators and cognitive system users. Some of the computing devices 104A-D include devices for a database storing the corpus or corpora of data 106 (which is shown as a separate entity in FIG. 1 for illustrative purposes only). Portions of the corpus or corpora of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus or corpora of data 106 for use as part of a corpus of data with the cognitive system 100. The document includes any file, text, article, or source of data for use in the cognitive system 100. Cognitive system users access the cognitive system 100 via a network connection or an Internet connection to the network 102, and input questions/requests to the cognitive system 100 that are answered/processed based on the content in the corpus or corpora of data 106. In one embodiment, the questions/requests are formed using natural language. The cognitive system 100 parses and interprets the question/request via a pipeline 108, and provides a response to the cognitive system user, e.g., cognitive system user 110, containing one or more answers to the question posed, response to the request, results of processing the request, or the like. In some embodiments, the cognitive system 100 provides a response to users in a ranked list of candidate answers/responses while in other illustrative embodiments, the cognitive system 100 provides a single final answer/response or a combination of a final answer/response and ranked listing of other candidate answers/responses.

The cognitive system 100 implements the pipeline 108 which comprises a plurality of stages for processing an input question/request based on information obtained from the corpus or corpora of data 106. The pipeline 108 generates answers/responses for the input question or request based on the processing of the input question/request and the corpus or corpora of data 106. The pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a pipeline of the IBM Watson™ cognitive system receives an input question or request which it then parses to extract the major features of the question/request, which in turn are then used to formulate queries that are applied to the corpus or corpora of data 106. Based on the application of the queries to the corpus or corpora of data 106, a set of hypotheses, or candidate answers/responses to the input question/request, are generated by looking across the corpus or corpora of data 106 for portions of the corpus or corpora of data 106 (hereafter referred to simply as the corpus 106) that have some potential for containing a valuable response to the input question/response (hereafter assumed to be an input question). The pipeline 108 of the IBM Watson™ cognitive system then performs deep analysis on the language of the input question and the language used in each of the portions of the corpus 106 found during the application of the queries using a variety of reasoning algorithms.

The scores obtained from the various reasoning algorithms are then weighted against a statistical model that summarizes a level of confidence that the pipeline 108 of the IBM Watson™ cognitive system 100, in this example, has regarding the evidence that the potential candidate answer is inferred by the question. This process is be repeated for each of the candidate answers to generate ranked listing of candidate answers which may then be presented to the user that submitted the input question, e.g., a user of client computing device 110, or from which a final answer is selected and presented to the user. More information about the pipeline 108 of the IBM Watson™ cognitive system 100 may be obtained, for example, from the IBM Corporation website, IBM Redbooks, and the like. For example, information about the pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As noted above, while the input to the cognitive system 100 from a client device may be posed in the form of a natural language question, the illustrative embodiments are not limited to such. Rather, the input question may in fact be formatted or structured as any suitable type of request which may be parsed and analyzed using structured and/or unstructured input analysis, including but not limited to the natural language parsing and analysis mechanisms of a cognitive system such as IBM Watson™, to determine the basis upon which to perform cognitive analysis and providing a result of the cognitive analysis.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing a knowledge level learning and response conversion engine 120, hereafter referred to simply as the knowledge engine 120. As shown in FIG. 1, the knowledge engine 120 comprises user profile logic 122, user knowledge level learning logic 124, facial expression recognition logic 126, tone analyzer logic 128, messaging/web system interaction analysis logic 129, and response conversion logic 130. The elements 122-130 perform various ones of their associated operations to learn the level of knowledge/comfort of users (also referred to as knowledge level) and apply that knowledge level to responses generated by the cognitive system 100 to thereby convert the response output to a corresponding level of content comprising references to concepts that correspond to the knowledge level of the user.

The user profile logic 122 provides logic for generating, maintaining, and retrieving user profiles for users that have registered with the cognitive system 100. The user profile logic 122 may access user profiles stored in the user profiles database 123. The user profiles in the user profile database 123 may include indicators of the level of knowledge/comfort (knowledge level) of the user, terms/phrases/features that have been previously determined to be found difficult to understand by the user, recognizable by the user, and the like, as well as other user information for characterizing the user. It should be appreciated that in some illustrative embodiments, the knowledge level of the user may represent a classification of the user into one of a plurality of predefined categories of types of users, where each category is representative of a different level of knowledge/comfort of the user with regard to a particular domain of information. In some cases, the user may have multiple different classifications or knowledge level identifiers where each may be associated with a different domain of information or different granularity within a domain of information, e.g., one identifier for medical domain, a second identifier for cancer research domain within the medical domain.

The user knowledge level learning logic 124 comprises logic, which may operate in conjunction with user profile logic 122, facial expression recognition logic 126, and tone analyzer logic 128, to learn the knowledge level of a user and store a corresponding identifier in the user's profile via the user profile logic 122. The user knowledge level learning logic 124 may initially present the user with an interface to a user, such as when the user registers with the cognitive system 100, through which the user specifies the user's perceived level of knowledge/comfort with a particular domain of information. For example, this interface may include a GUI element which is able to be manipulated by the user to specify a knowledge level within a range of possible knowledge levels. For example, a slider bar may be provided with one end of the slider bar representing a lower end of the range and another end of the slider bar representing a higher end of the range. In an example in which the domain of information is an information technology domain regarding an organization's computer system resources, a low end may be an IT technician level indicating the ability to understand technical details, and the high end may be a business level indicating a lack of understanding of technical details and a comfort with higher level business concepts rather than technical concepts.

In some illustrative embodiments, the initial user input specifying the user's knowledge level may be considered a baseline knowledge level of the user that is stored in the user's profile in database 123. The user knowledge level learning logic 124 may modify this baseline knowledge level based on results of analyzing user reactions to responses generated by the cognitive system 100 to requests submitted by the user. These reactions may be identified using facial expression recognition, analysis of follow-up or clarification request submissions, tone analysis, analysis of other messaging system messages and/or internet (web) based messages submitted by the user, and the like. For example, in response to a user being presented with a response by the cognitive system 100, the facial expression recognition logic 126 may interface with image capturing equipment, such as may be provided on or in association with the user's client computing device 110, to analyze the facial expressions of the user and determine if the user's facial expressions indicate confusion or frustration on the part of the user. One example of a mechanism that may be used to implement the facial expression recognition logic 126 is the IBM Watson Foundations facial recognition logic, such as is described in "IBM Watson Solution Offers Real-Time Facial Expression Data—Are We Ready," Lori Richardson, Jun. 30, 2015 available at the Score More Sales website.

If the facial expression does not indicate confusion or frustration, it may be assumed that the user understood the response and/or was comfortable with the knowledge level of the response. If the facial expression does indicates confusion or frustration, it may be determined that the user does not have the knowledge level to understand the concepts presented in the response or is not comfortable with the knowledge level associated with those concepts. As a result, the knowledge level of the user may be shifted along the range of possible knowledge levels towards one of the ends of the range. For example, if it is determined that the user is comfortable with the knowledge level of the concepts in the response, then the knowledge level of the user may be maintained at a current position, or shifted towards a lower, e.g., more technical detail, end of the range. If it is determined that the user is not comfortable with the knowledge level of the concepts in the response, then the knowledge level of the user may be shifted towards a higher, e.g., less technical detail and more business level concepts, end of the range.

Similarly, the user knowledge level learning logic 124 may analyze the user's reactions with regard to whether the user follows-up the original request, within a predetermined period of time, e.g., 30 seconds, with a subsequent request for clarifying information. If the user does follow-up with a clarifying request, i.e. a request that specifies one or more concepts referenced in the previous response generated by the cognitive system 100, within the predetermined period of time, it may be determined by the user knowledge level learning logic that the user was not comfortable with the knowledge level of the concepts in the response. If such a clarifying request is not submitted, then it may be determined that the user is comfortable with the knowledge level of the concepts in the response. Again, shifting of the knowledge level of the user to one or the other end of the range may be performed based on the results of the analysis as to whether the user is comfortable with the knowledge level of the concepts in the response.

The tone analyzer logic 128 may analyze any subsequent clarifying requests from the user to determine a sentiment or tone of the subsequent clarifying request. The tone analyzer logic 128 may be implemented, for example, using IBM Watson Tone Analyzer, for example, to detect whether a user's input indicates confusion or frustration on the part of the user (see Tone Analyzer, on the IBM Watson Developer Cloud website). If the user's tone in a subsequent clarifying request is indicative of confusion or frustration, then it may be determined that the user was not comfortable with the knowledge level of the concepts in the response form the cognitive system 100. If the user's tone in the subsequent clarifying request does not indicate confusion or frustration, then it may be determined that the user is more comfortable with the knowledge level of the concepts in the response. In embodiments where the tone analyzer logic 128 works in combination with the determination above as to whether a clarifying request is submitted or not, the tone analyzer logic 128 may indicate a greater or less degree of comfort with the knowledge level of the concepts in the request, e.g., if a clarifying request is submitted then the shifting of knowledge level of the user may be made by a first amount, and if the tone analyzer indicates confusion or frustration, the knowledge level may be shifted by a greater amount. Again, the shifting may be done based on whether or not it is determined that the user was comfortable with the knowledge level of the concepts in the response or not.

The tone analyzer logic 128 may also be used with messages submitted by the user referencing concepts in the response in other messaging systems, such as instant messages, email, or even messages posted to various types of sites on the web or local area networks. Similar to the analysis performed on the subsequent requests, tone may indicate levels of confusion or frustration which may be correlated with shifts in knowledge level of the user as discussed above.

The amount of shifting of the knowledge level of a user based on analysis of facial expressions, tone, follow-up/clarifying questions, etc., may be implementation dependent. In some illustrative embodiments, a binary approach may be utilized such that as the user uses the engine 120 over time, the engine 120 learns associations of levels of confusion on the part of the user relative to particular facial expressions and tones and thus, when evaluating later facial expressions or tones may identify a level of confusion. Similarly, analysis of phrases and terms used in follow-up/clarifying questions and/or messaging system messages may be indicative of a level of frustration or confusion on the part of the user. This information may be correlated with an amount of shift to be performed. In a binary approach, if the user is determined to be very confused, the shift may go from a current position along the range to toward the lower end of the range by half, for example. If not very confused, this shift may be only a quarter of the way along the range to the end.

If the engine 120 does not know the correlations of facial expression, tone, or phrases/terms used by the user to represent frustration or confusion, then the knowledge level of the user may be calibrated back to a middle of the range and then the shift may be performed half the distance to the opposite side of the range from where the user indicates that their knowledge level currently resides, e.g., if the user indicates that they are a technical user at approximately one quarter of the way from the middle of the range to the technical user end of the range, the shift may take half the distance (which is ¾ of the rest of the way along the range to the technical user end) and shift the user's knowledge level that amount towards the business user end of the range. Any suitable mechanism for determining an amount of shifting to perform based on a determined knowledge level or amount of frustration/confusion of the user may be used without departing from the spirit and scope of the illustrative embodiments.

It should be appreciated that the types of user reaction information analyzed by the logic elements 124-129 are only examples of user reaction information that may be used to determine whether or not the user is comfortable with the knowledge level of the concepts included in the cognitive system 100 response to the user's request. Other types of user reaction information may also be analyzed in addition to, or in replacement of, one or more of the user reaction information types analyzed by the logic elements 124-129. For example, audio user reaction information may be analyzed, such as by way of using speech recognition, volume analysis, and the like, to identify terms/phrases uttered by the user in reaction to a response from the cognitive system 100 and correlating those terms/phrases with levels of confusion or frustration, to identify volume levels indicative of confusion or frustration, or the like. The logic elements 124-129, and/or other logic for performing analysis of other user reaction information, may operate in conjunction with appropriate sensors or input devices provided at user computing devices, such as client device 110 or 112, to provide the user reaction information.

The analysis performed by the various logic elements 124-129 may be performed automatically and dynamically by the knowledge engine 120 in conjunction with the cognitive system 100 as users submit requests to the cognitive system. Thus, the knowledge level of the user with regard to various domains of information may be dynamically updated and stored in the user profile for the user in the database 123. The user may have separate knowledge level indicators for different domains of information. Thus, when a request is submitted to the cognitive system 100, as part of the processing of the request by the cognitive system 100, the system 100 may identify the domain of the request, the user submitting the request, and retrieve the user's profile and identify the knowledge level indicator of that user for the particular domain. This information may then be used by the response conversion logic 130 to convert a response generated by the cognitive system 100 to a knowledge level corresponding to that of the user, i.e. convert the response such that the knowledge level of the concepts specified in the response are at the same or higher level as the knowledge level of the user.

The cognitive system 100, in response to the receipt of the request from the user, parses the request and processes the request via the pipeline 108 to generate a response output, e.g., an answer to a question submitted by the user or the information requested by the user. Depending on the particular request and the corresponding information needed to provide the response, the knowledge level of the concepts in the response from the cognitive system 100 may have various levels. The knowledge level of concepts may be determined from the ontologies, organizational information, and the like, provided in the corpora 140. For example, in some illustrative embodiments, as noted above, a CMDB having CIs for each of the components of one or more computing systems may be provided that is organized into hierarchical ontologies showing the relationships between the components. Similar ontologies may be constructed for other domains as well, e.g., ontologies of medical concepts.

In general, in an example embodiment in which the ontologies are directed to IT resources, software components may be associated with other software components and with one or more computing hardware devices, e.g., an application may be associated with other applications and with a particular processor that executes the application. The computing hardware devices may also be associated with a system, such as a server or set of servers, for example. The system may be associated with a business component of the computing system, such as a business department or other higher level organizational representation of the components. For example, a credit card payment processing application may be associated with a processor of a server, which is assigned to a payment processing department of an organization. Any hierarchical or ontological configuration of resources may be used without departing from the spirit and scope of the illustrative embodiments, and may be represented in the CIs of the CMDB or other organizational/resource information in the corpora 140.

The various levels of the ontology or hierarchical configuration may be associated with different levels of knowledge/comfort of users. For example, information describing server computing devices, processors, or lower level technical information of applications may be considered at a technical level of knowledge, whereas information directed to the business organizational component with which such resources are associated may be considered a business level of knowledge. Moreover, in some embodiments, the CIs or other configuration information for components of the system may have associated parameters specifying the level of knowledge with which the CIs are associated.

When generating a response to a user request, the cognitive system 100 may reference concepts within the response, e.g., references to resources or characteristics/parameters of the resources, which may be correlated using the corpora 140 to a level of corresponding component in the ontology or other hierarchical representation of the resources. This level corresponds to the knowledge level of the concept in the response and may be compared to the knowledge level of the user, such as is retrieved from the user profile based on the identified domain of the request and the identifier of the user submitting the request. If the knowledge level of the concept in the response is lower level than the knowledge level of the user, the ontology or hierarchical representation of the resources may be traversed up the ontology or hierarchy to find an instance of a resource that has a knowledge level matching or higher than the user knowledge level. This information is then used to convert the original response generated by the cognitive system 100 to a modified response that is tailored to the knowledge level of the user by reformulating the response to reference the higher knowledge level resource. These operations may be performed by the response conversion logic 130.

The resulting modified response that is tailored to the knowledge level of the user is output to the user's computing device, e.g., client device 110. As discussed above, the user's reaction to the output response may be monitored so as to dynamically update the user's knowledge level as noted above. For example, the user's knowledge level may be shifted one way or the other along a range of knowledge level values for the domain.

When evaluating the correlation of the knowledge level of concepts in the response generated by the cognitive system, and the knowledge level of the user, if it is determined that the knowledge level of the user is more of a business level of knowledge, information in the CIs regarding business value and seasonality as discussed above may be utilized to modify the content of the generated response based on a prioritization of the business level resources that are identified in the output response. For example, as noted above, when evaluating threats to a computing system, patch/threat database of the corpora 140 may be searched to identify threats and associated patches, the CMDB may be searched to identify components affected by the patches and their corresponding CIs including the business value and seasonal information for the components, business rules of the corpora 140 may be searched to identify business rules that affect application of the patches to components, and the like. Based on all of this information, such as previously described above, content of a modified response may be generated and output to the user's client computing device.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 2 is provided as an example of one type of data processing system in which aspects of the present invention may be implemented. Many other types of data processing systems may be likewise configured to specifically implement the mechanisms of the illustrative embodiments.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates an example of a cognitive system processing pipeline which, in the depicted example, is a question and answer (QA) system pipeline used to process an input question in accordance with one illustrative embodiment. As noted above, the cognitive systems with which the illustrative embodiments may be utilized are not limited to QA systems and thus, not limited to the use of a QA system pipeline. FIG. 3 is provided only as one example of the processing structure that may be implemented to process a natural language input requesting the operation of a cognitive system to present a response or result to the natural language input.

The QA system pipeline of FIG. 3 may be implemented, for example, as QA pipeline 108 of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA pipeline 300 comprises a plurality of stages 310-380 through which the cognitive system operates to analyze an input question and generate a final response. In an initial question input stage 310, the QA pipeline 300 receives an input question that is presented in a natural language format. That is, a user inputs, via a user interface, an input question for which the user wishes to obtain an answer, e.g., "Who are my best customers?" In response to receiving the input question, the next stage of the QA pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person or persons is being sought, "my" may be identified as an indicator of a particular person with which the question is associated (in this case the user submitting the question), "best" may be identified as a word indicative of proximity or relationship, and "customers" may be indicative of a noun or other language topic, e.g., a category of persons to be included in the answer to the question.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What security vulnerability was discovered last month?" the LAT is the string "vulnerability." The focus of a question is the part of the question that, if replaced by the answer, makes the question a standalone statement. For example, in the above question "What security vulnerability was discovered last month?," the focus is "security vulnerability" since if this word were replaced with the answer, e.g., the answer "DDOS vulnerability" can be used to replace the term "security vulnerability" to generate the sentence "DDOS vulnerability was discovered last month." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "security vulnerability," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "security vulnerability" in content of the corpus (also referred to as evidence, or evidence passages) is given a highest score. A synonym of security vulnerability, such as "exploit" may be given a lower score but still higher than a synonym of the type "security hole" or "breach." Instances of the exact matches and synonyms for each evidence passage may be compiled and used in a quantitative function to generate a score for the degree of matching of the evidence passage to the input question.

Thus, for example, a hypothesis or candidate answer to the input question of "What are my current security vulnerabilities?" is "distributed denial of service attack." If the evidence passage contains the statements "The payment processing system has a security vulnerability to distributed denial of service attack. A DDOS exploit is an attack by multiple infected systems against another system to deny service by the attacked system" and the algorithm is looking for exact matches or synonyms to the focus of the input question, i.e. "security vulnerabilities," then an exact match of "security vulnerability" is found in the first sentence of the evidence passage and a highly scored synonym to "security vulnerability," i.e. "exploit" is found in the second sentence of the evidence passage. This may be combined with further analysis of the evidence passage to identify that the text of the candidate answer is present in the evidence passage as well, i.e. "distributed denial of service" or "DDOS". These factors may be combined to give this evidence passage a relatively high score as supporting evidence for the candidate answer "distributed denial of service" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA pipeline 300 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 300 that identifies a manner by which these scores may be combined to generate a confidence score or measure for the individual hypotheses or candidate answers. This confidence score or measure summarizes the level of confidence that the QA pipeline 300 has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

As shown in FIG. 3, in accordance with one illustrative embodiment, the pipeline 300 is augmented to include or operate with the knowledge system 120, which is shown as a separate element for ease of depiction but may be integrated into the pipeline 300. In one illustrative embodiment, the knowledge system 120 may operate on responses generated by the pipeline 300 at the final answer and confidence stage logic 380. That is, the final answer and confidence stage logic 380 may generate a response to the user's input request/question which is then processed by the knowledge system 120 in the manner previously described above.

The knowledge system 120 may obtain user information and domain information regarding the input request/question from the question topic and analysis stage logic 320, for example, and may retrieve a corresponding user profile and identify a knowledge level for the domain as identified in the corresponding user profile. The knowledge system 120 may further retrieve knowledge levels of concepts in the response from the corpora 345 and may identify alternative or replacement concepts from ontological or hierarchical representations in the corpora 345, e.g., CMDB or the like.

The knowledge system may further receive user reaction information, such as by monitoring for clarifying questions, applying tone analysis, obtaining user images and performing facial expression analysis, or the like. This information may be used to determine modifications to the knowledge level associated with the user and the domain of the request, such as by shifting the knowledge level along a range of values based on the determinations of whether or not the user is comfortable with the knowledge level of the concepts present in the response that was output to the user via their client computing device.

Thus, the illustrative embodiments provide mechanisms for performing automated technical content conversion based on a determined user understanding level. The illustrative embodiments evaluate the correlation of concepts in a response generated by a cognitive system with the knowledge level of the user in the domain of those concepts. The evaluation of the user's knowledge level may make use of a user's specification of their knowledge level, as well as dynamic adjustment of the user's knowledge level from their reactions to previous responses generated by the cognitive system and the knowledge level of the concepts present in those previous responses.

Figure 4:
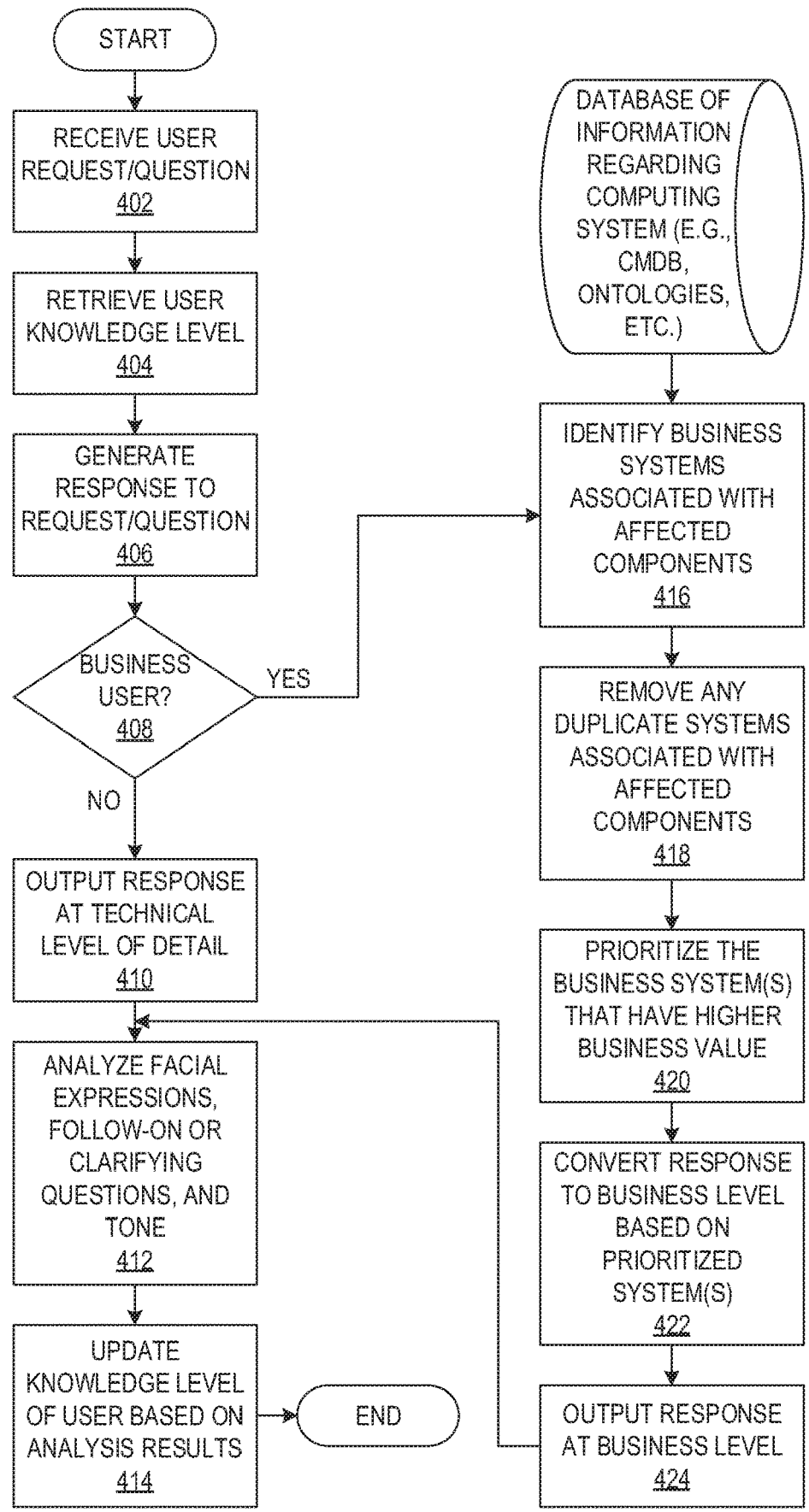
FIG. 4 is a flowchart outlining an example operation of a knowledge system in accordance with one illustrative embodiment.

FIG. 4 is a flowchart outlining an example operation of a knowledge system in accordance with one illustrative embodiment. The example operation in FIG. 4 assumes that the range of knowledge level has two classifications or categories of user knowledge level or concept knowledge level for ease of explanation. The two knowledge level categories are technical knowledge level or business knowledge level. While knowledge level values may have many different values within each categorization along a range of values, at a predetermined point, e.g., a midpoint, along the range the category changes from technical knowledge level category to business level category, or vice versa. The knowledge level may be shifted along this range one way or the other and may eventually shift past this demarcation point from one category to the other.

As shown in FIG. 4, the operation starts by receiving a user request/question in the cognitive system (step 402). The user from which the request/question is received is identified and a corresponding user profile is obtained from which a knowledge level of the user is obtained (step 404). The cognitive system then processes the request, such as via a request or QA pipeline as described above, to generate a response to the request/question (step 406).

A determination is made as to whether or not the user's knowledge level is a business level user (step 408). If not, the response generated by the cognitive system is output at the technical level of detail (step 410). The user's reaction to the output response is monitored and analyzed, such as via facial expression analysis, follow-up or clarifying question submission, tone analysis, or the like (step 412) and the user's knowledge level is updated if needed based on the results of the analysis of the user's reaction (step 414). The operation then terminates.

If the user is determined to be a business level user, the business level systems associated with the affected components specified in the response are identified (step 416). This may involve utilizing information from the corpus including a database of information regarding the computing system, e.g., CMDB, ontologies, and the like. Any duplicates found when identifying affected components are removed so as to not be repetitive in the modified response that is generated (step 418).

The business level systems affected by the components referenced in the response are prioritized based on business value, seasonality, business rules, and the like (step 420). Based on the prioritized business level systems affected, the response is converted to a business level response (step 422) and output to the user's client computing device (step 424). The operation then proceeds to step 412 where monitoring of the user's reaction is performed and the user's knowledge level is updated as needed (414), with the operation again terminating thereafter. It should be appreciated that while the flowchart shows the operation terminating, this operation may be repeated automatically with each subsequent request/question submitted by the user such that a dynamic modification of responses based on user knowledge level, and a dynamic modification of user knowledge level based on user reactions is achieved.

It should be appreciated that the above description of the illustrative embodiments set forth a plurality of examples which are intended to be only illustrative of the various aspects of the present invention. Many modifications to these illustrative embodiments may be implemented without departing from the spirit and scope of the illustrative embodiment. For example, while the above embodiments are described in terms of the user inputting a question or information request for virtually immediate answering by the cognitive system, the illustrative embodiments are not limited to such. Rather, the question or request may be a request to be notified at a later time when certain conditions occur within the particular domain, e.g., when a security vulnerability is discovered, when an attack is detected, when a component of the computing system experiences a failure, etc. The mechanisms of the illustrative embodiments may still be utilized to generate a response and evaluate the knowledge levels of the user and the contents of the response, as well as the user's reaction, to modify the responses or notifications generated by the cognitive system to match the knowledge level of the user. Of course other modifications can also be implemented without departing from the spirit and scope of the present invention.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions which are executed by the processor to configure the processor to implement a knowledge system that operates to modify responses based on a knowledge level of a user, the method comprising:

receiving, by the knowledge system, from a cognitive computing system, a response to a user submitted request received by the cognitive computing system from a client computing system;

determining, by the knowledge system, a first knowledge level of the user for a domain of the user submitted request;

determining, by the knowledge system, a second knowledge level associated with first concepts referenced in the response;

determining, by the knowledge system, whether the first knowledge level is different from the second knowledge level;

modifying, by the knowledge system, in response to the first knowledge level being different than the second knowledge level, content of the response to include second concepts, corresponding to the first concepts, which are associated with the first knowledge level, to thereby generate a modified response; and outputting, by the knowledge system, the modified response to the client computing system associated with the user.

2. The method of claim 1, further comprising:

monitoring, by the knowledge system, a user reaction of the user to an output of the response to the user submitted question by the cognitive system;

analyzing, by the knowledge system, the user reaction to determine a frustration or comfort level of the user with regard to content of the response; and modifying, by the knowledge system, the first knowledge level of the user with regard to the domain of the user submitted request based on results of the analysis of the user reaction to generate an updated first knowledge level.

3. The method of claim 2, wherein modifying the first knowledge level of the user with regard to the domain of the user submitted request comprises shifting a first knowledge level value along a range of knowledge values by a differential amount determined based on the frustration or comfort level, and storing the shifted first knowledge level, as the updated first knowledge level, in association with an identifier of the domain of the user submitted request in a user profile associated with the user.

4. The method of claim 2, wherein determining whether the first knowledge level is different from the second knowledge level comprises comparing the second knowledge level to the updated first knowledge level, and wherein modifying content of the response comprises modifying content of the response to include second concepts, corresponding to the first concepts, which are associated with the updated first knowledge level, to thereby generate the modified response.

5. The method of claim 2, wherein the user reaction is a facial expression of the user, and wherein analyzing the user reaction to determine a frustration or comfort level of the user comprises identifying a facial expression of the user as being an expression of frustration or discomfort with the second knowledge level associated with the first concepts in the response.

6. The method of claim 2, wherein the user reaction is a tone of a user audible or textual message responsive to the output of the response, and wherein analyzing the user reaction to determine a frustration or comfort level of the user comprises identifying terms or phrases used in the message responsive to the output as indicating frustration or discomfort with the second knowledge level associated with the first concepts in the response.

7. The method of claim 2, wherein the user reaction is a follow-up or clarifying question submitted to the cognitive system within a predetermined time period of outputting the response, and wherein analyzing the user reaction to determine a frustration or comfort level of the user comprises determining whether the follow-up or clarifying question references a concept in the response.

8. The method of claim 1, wherein the second knowledge level is a relatively more detailed knowledge level than the first knowledge level, and wherein modifying content of the response to include second concepts, corresponding to the first concepts, which are associated with the first knowledge level, to thereby generate a modified response comprises identifying, in an ontology of concepts, second concepts that are at a higher level of abstraction in the ontology than the first concepts but which are associated with the first concepts in the ontology.

9. The method of claim 1, wherein modifying content of the response to include second concepts, corresponding to the first concepts, which are associated with the first knowledge level, to thereby generate a modified response comprises:

retrieving, from a configuration management database, information for at least one second concept of the second concepts indicating at least one business value and corresponding seasonality of the at least one second concept; and modifying the content of the response to specify a current business value of the at least one second concept based on the at least one business value and corresponding seasonality.

10. The method of claim 1, wherein determining a first knowledge level of the user for the domain of the user submitted request comprises:

retrieving a user profile associated with the user, wherein the user profile comprises a plurality of knowledge levels associated with different domains in a plurality of domains;

determining, based on results of analysis of the user submitted request by the cognitive computing system, the domain of the user submitted request; and retrieving, from the user profile, the first knowledge level based on a lookup of the domain of the user submitted request in the plurality of domains.

11. A computer program product comprising a computer readable storage medium having a computer readable program stored therein, wherein the computer readable program, when executed on a computing device, causes the computing device to:

receive, from a cognitive computing system, a response to a user submitted request received by the cognitive computing system from a client computing system;

determine a first knowledge level of the user for a domain of the user submitted request;

determine a second knowledge level associated with first concepts referenced in the response;

determine whether the first knowledge level is different from the second knowledge level;

modify, in response to the first knowledge level being different than the second knowledge level, content of the response to include second concepts, corresponding to the first concepts, which are associated with the first knowledge level, to thereby generate a modified response; and output the modified response to the client computing system associated with the user.

12. The computer program product of claim 11, wherein the computer readable program further causes the computing device to:

monitor a user reaction of the user to an output of the response to the user submitted question by the cognitive system;

analyze the user reaction to determine a frustration or comfort level of the user with regard to content of the response; and modify the first knowledge level of the user with regard to the domain of the user submitted request based on results of the analysis of the user reaction to generate an updated first knowledge level.

13. The computer program product of claim 12, wherein the computer readable program further causes the computing device to modify the first knowledge level of the user with regard to the domain of the user submitted request at least by shifting a first knowledge level value along a range of knowledge values by a differential amount determined based on the frustration or comfort level, and storing the shifted first knowledge level, as the updated first knowledge level, in association with an identifier of the domain of the user submitted request in a user profile associated with the user.

14. The computer program product of claim 12, wherein the computer readable program further causes the computing device to determine whether the first knowledge level is different from the second knowledge level at least by comparing the second knowledge level to the updated first knowledge level, and wherein the computer readable program further causes the computing device to modify content of the response at least by modifying content of the response to include second concepts, corresponding to the first concepts, which are associated with the updated first knowledge level, to thereby generate the modified response.

15. The computer program product of claim 12, wherein the user reaction is a facial expression of the user, and wherein the computer readable program further causes the computing device to analyze the user reaction to determine a frustration or comfort level of the user at least by identifying a facial expression of the user as being an expression of frustration or discomfort with the second knowledge level associated with the first concepts in the response.

16. The computer program product of claim 12, wherein the user reaction is a tone of a user audible or textual message responsive to the output of the response, and wherein the computer readable program further causes the computing device to analyze the user reaction to determine a frustration or comfort level of the user at least by identifying terms or phrases used in the message responsive to the output as indicating frustration or discomfort with the second knowledge level associated with the first concepts in the response.

17. The computer program product of claim 12, wherein the user reaction is a follow-up or clarifying question submitted to the cognitive system within a predetermined time period of outputting the response, and wherein the computer readable program further causes the computing device to analyze the user reaction to determine a frustration or comfort level of the user at least by determining whether the follow-up or clarifying question references a concept in the response.

18. The computer program product of claim 11, wherein the second knowledge level is a relatively more detailed knowledge level than the first knowledge level, and wherein the computer readable program further causes the computing device to modify content of the response to include second concepts, corresponding to the first concepts, which are associated with the first knowledge level, to thereby generate a modified response at least by identifying, in an ontology of concepts, second concepts that are at a higher level of abstraction in the ontology than the first concepts but which are associated with the first concepts in the ontology.

19. The computer program product of claim 11, wherein the computer readable program further causes the computing device to determine a first knowledge level of the user for the domain of the user submitted request at least by:

retrieving a user profile associated with the user, wherein the user profile comprises a plurality of knowledge levels associated with different domains in a plurality of domains;

determining, based on results of analysis of the user submitted request by the cognitive computing system, the domain of the user submitted request; and retrieving, from the user profile, the first knowledge level based on a lookup of the domain of the user submitted request in the plurality of domains.

20. An apparatus comprising:

a processor; and a memory coupled to the processor, wherein the memory comprises instructions which, when executed by the processor, cause the processor to:

receive, from a cognitive computing system, a response to a user submitted request received by the cognitive computing system from a client computing system;

determine a first knowledge level of the user for a domain of the user submitted request;

determine a second knowledge level associated with first concepts referenced in the response;

determine whether the first knowledge level is different from the second knowledge level;

modify, in response to the first knowledge level being different than the second knowledge level, content of the response to include second concepts, corresponding to the first concepts, which are associated with the first knowledge level, to thereby generate a modified response; and output the modified response to the client computing system associated with the user.

\* \* \* \* \*